May 2, 1961 H. HERRMANN 2,982,391

SWING LOADING SYSTEM

Filed March 11, 1958 7 Sheets-Sheet 1

INVENTOR
HELMUT HERRMANN

BY
Burgess, Dinklage & Sprung
ATTORNEYS

INVENTOR
HELMUT HERRMANN
BY
Burgess, Dinklage & Sprung
ATTORNEYS

INVENTOR
HELMUT HERRMANN
BY
Burgess, Dinklage & Sprung
ATTORNEYS

May 2, 1961 H. HERRMANN 2,982,391

SWING LOADING SYSTEM

Filed March 11, 1958 7 Sheets-Sheet 4

INVENTOR
HELMUT HERRMANN
BY
Burgess, Dinklage & Sprung
ATTORNEYS

INVENTOR
HELMUT HERRMANN
BY
Burgess, Dinklage & Sprung
ATTORNEYS

May 2, 1961 H. HERRMANN 2,982,391

SWING LOADING SYSTEM

Filed March 11, 1958 7 Sheets-Sheet 6

INVENTOR
HELMUT HERRMANN
BY
Burgess, Dinklage & Sprung
ATTORNEYS

INVENTOR
HELMUT HERRMANN
BY
Burgess, Dinklage & Sprung
ATTORNEYS

United States Patent Office 2,982,391

Patented May 2, 1961

2,982,391

SWING LOADING SYSTEM

Helmut Herrmann, Lunen, Germany, assignor to Gewerkschaft Eisenhutte Westphalia, Wethmar, near Lunen, Germany, a German corporation Filed Mar. 11, 1958, Ser. No. 720,660

Claims priority, application Germany Mar. 14, 1957

13 Claims. (Cl. 198—14)

It is known in the art of conveying to effect the conveyance by means of a conveyor trough provided with a shovel which is pushed quickly into the material to be collected and is then withdrawn slowly therefrom. Due to the rapid forward thrust and the inertia of the material, a sliding movement takes place on the surface of the trough which effects the transport or feed of the material. Based on this principle, thrust shovel loading devices and shaking chutes are known which have been introduced in the mining industry.

With this system of conveyance only very little energy is required for the conveying operation, so that micro-reciprocating plate conveyors are being introduced to an ever increasing extent. If, however, the reciprocation is utilized at the same time for charging the loading device, in that the swinging loading shovel is subjected to a pressing force in the loading direction, it is necessary to employ devices for producing the reciprocating movement by which considerable forces are liberated. In this case eccentric or electric oscillating devices cannot be used because the bearing stresses become too great. It has therefore already been suggested to use reciprocating piston devices operated by compressed air or diesel engines, when the swinging direction is preferably at an acute angle to the conveying direction.

The problem which the invention sets out to solve is to produce a loading machine which can be used, for example, for carrying away the heaps of debris produced underground in driving a heading. Such a machine must therefore run on rails or endless tracks, be easy to dismantle and its dimensions must be adapted to the conditions in the underground working.

To enable the material picked up to be transferred to the conveying means, it must be possible to lift this material to a certain height and the machine must be equipped with a loading device which is capable of penetrating raw rock and to collect the material to be conveyed.

To attain this object, the inertia energy to be applied must amount to about 100 kgs./m. whereas a pressure of only 5 to 8 tons is sufficient. The oscillating or reciprocating mass itself should be as free as possible and only capable of swinging under the influence of the material to be charged. The loading arrangement should be capable of swinging both vertically and laterally and it must be possible for the whole loading machine to travel underground.

The known requirements for such machines in underground workings must, in order to attain a constructional solution, be made to conform with the requirements which obtain when using the swinging system.

To solve this problem the loading arrangement is, according to the invention, only shiftable in longitudinal direction at one point and is preferably connected with the chassis of the vehicle by an elastic Cardan mechanism.

To enable the swing trough to turn about a vertical axis, hydraulic or pneumatic cylinders are provided on both sides of the chassis and are connected on the one hand with the conveyor and on the other hand with the swing trough. The cylinders preferably engage the swing trough through the intermediary of spring elements, whereas the piston rods are fixed on both sides to the chassis. The swing elements ensure an elastic connection between the cylinders and the swing trough and consist of two spring members which are linked together.

However, these cylinders do not serve only for obtaining a swinging movement but also for pressing the swing trough or the shovel against the heap of debris and for advancing the vehicle according to the progress of the shovel, after the device clamping the machine to the rails has been released. For this purpose the heavy loading trough forms a holding resistance. The oscillating device consists of two reciprocating engines which are mounted on the two sides of the loading trough so that the rectilineal swinging direction etxends in known manner at an acute angle to the longitudinal axis of the conveyer trough. The point of engagement of the reciprocating drive is displaced in relation to the centre of gravity of the swinging mass in the direction towards the loading shovel, so that displacement of the centre of gravity can be compensated by the debris collected. The longitudinal axis of the oscillating trough is preferably arranged at an angle of 5 to 8° to the floor of the working and the length of the chassis is in a ratio of about 1:3 to the length of the swinging trough. These dimensional rules represent the most advantageous solution for the constructional design of the subject matter of the invention. The end of the swing trough carrying the loading shovel is provided with a support runner in known manner, but this runner is not confined to rails as in the case of the known arrangements of this type, but consists of a tub-shaped plate which is fixed on the trough by elastic connecting means, such as rubber cushions. As already mentioned, the swing trough and the loading shovel are connected to the chassis only at one point, a Cardan elastic connection being provided which consists substantially of a length of tube rotatable about an axle and fixed to the rubber cushions which in turn are rigidly connected to the swinging mass. The axle within the tube is mounted in slots, so that the tube is capable of turning within certain limits, that is has a certain amount of play. This length of tube is connected to a plate which slidably engages in a guide fixed on the chassis of the vehicle. The frame of the chassis is preferably of rectangular shape and carries two mutually parallel girders between which the wheels are mounted. These parallel wheel carriers are mutually displaceable so that the chassis can be adjusted to different track widths. Rail clamping devices are provided in known manner, but the operating levers are always so located in the corners of the rectangular frame that their free ends are connected by links with the end of a piston or a cylinder of a pneumatic system arranged in the middle of the frame and in the direction of the rails. The clamping device is suspended in the chassis frame with a considerable amount of play and the clamping is effected by clamping jaws which are controlled by suitable cams. The constructional design of the loading machine according to the invention can be manifold.

One embodiment of the invention combined with suitable auxiliary equipment is illustrated by way of example in the accompanying drawings, in which.

Figure 1:
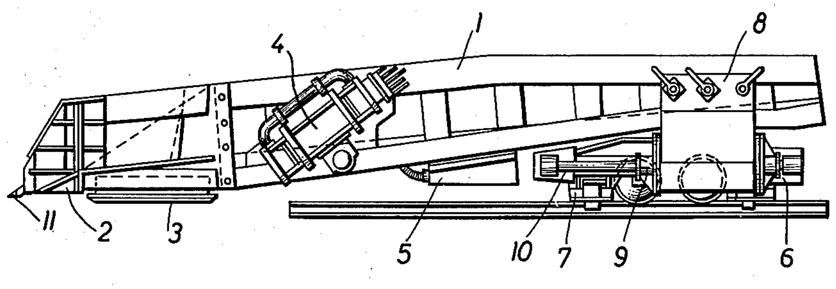
Fig. 1 shows a loading machine according to the invention in side elevation.
Figure 2:
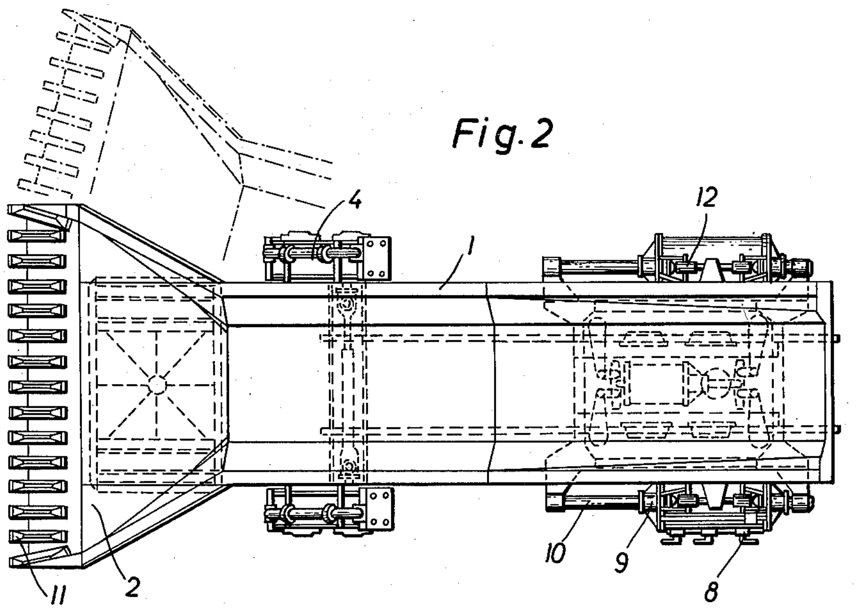
Fig. 2 is a top plan view of Fig. 1.

The swing loader illustrated in Figs. 1 and 2 consists of a trough 1 and a loading head in the form of a shovel 2 on the front end of the trough, which shovel has penetrating teeth 11 on its front edge. Below the loading shovel a support runner 3 is provided which is elastically connected to the loading shovel 2 and rests or slides on the floor of the working. Approximately in the centre of gravity of the loading trough with the shovel, a swinging or reciprocating drive 4 in the form of two piston engines is provided, these engines being arranged one on each side of the trough. The direction of swing is at an acute angle to the longitudinal axis of the conveyor trough. The exhaust air is conducted through suitable pipelines into the silencer 5 and thence passes out into the open. At its rear end the swing trough rests on the chassis 6. The piston rods 10 cooperating with the pressure cylinders 9 are fixed to the two sides of the chassis. The movable cylinders 9 themselves are connected to the trough by spring elements 12 (see Fig. 2). A rail clamping device 7 is suspended under the chassis and an operating stand 8 is arranged directly on the pressure cylinder on one side of the swing loader.

Figure 3:
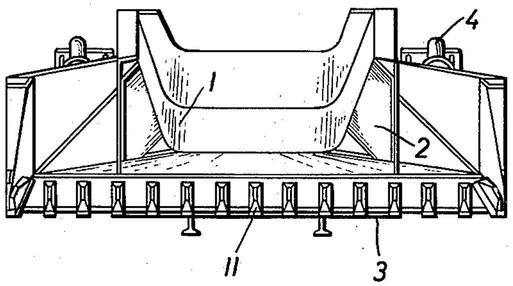
Figs. 3 and 4 are front and rear elevations respectively of the machine illustrated in Figs. 1 and 2.
Figure 4:
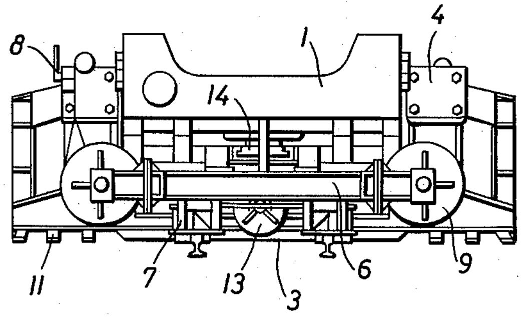
Figure 5:
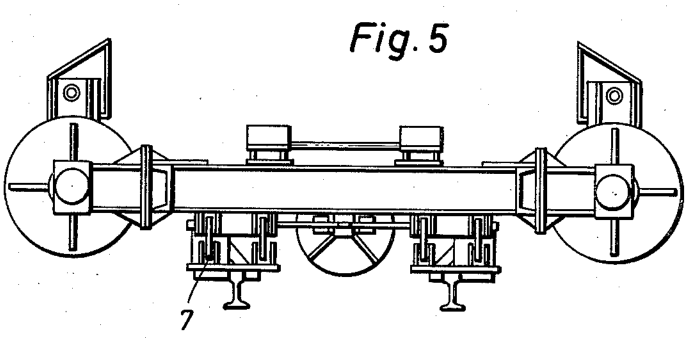
Figs. 5 and 6 show in front and rear elevation respectively the vehicle chassis without the trough mounted thereon.
Figure 6:
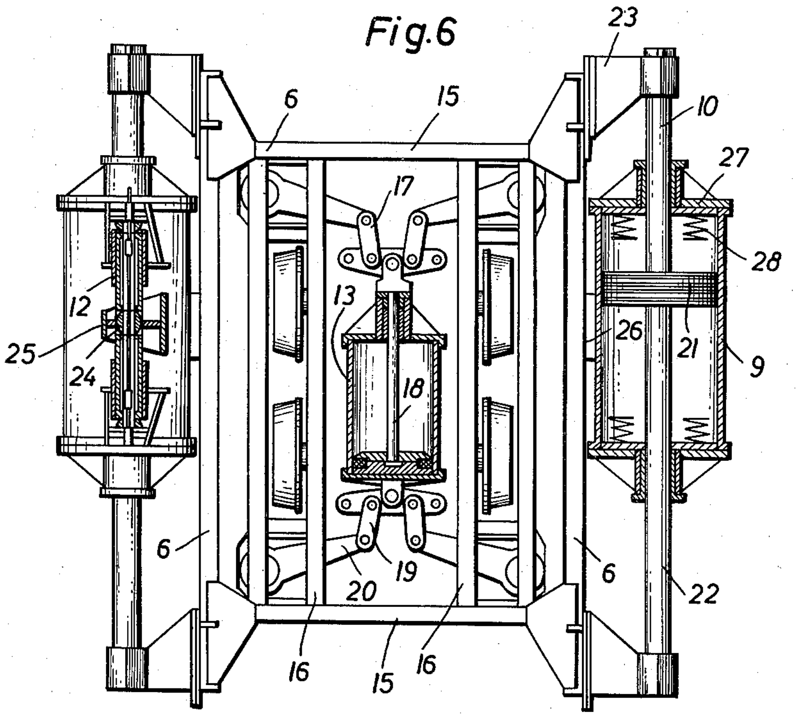

The front elevation in Fig. 3 shows the shape of the swing trough 1 and the arrangement of the thrust teeth 11 ind the slide runner 3. The two engines of the reciprocating device 4 can be seen above the swing loader. The rear elevation in Fig. 4 shows in addition, the clamping cylinder 13 and also the constructional design of the pressure cylinders 9, the operating stand 8 mounted thereon and the support 14 of the swing trough 1 on the chassis 6. The chassis in Fig. 6 and in the corresponding front view in Fig. 5 enables the construction to be seen by which the many functions necessary can be carried out by simple means. On the simple, substantially rectangular chassis frame 6 two wheel carriers 16 are mounted parallel to each other between the girders 15 so that the space between the wheels can be adapted to the actual width of the track laid underground. The clamping devices 7 (see also Fig. 4) are hingedly mounted on these wheel carriers and, with the aid of controlling devices 17/18, enable the chassis to be fixed to the rails. For operating the clamping arrangement 7 a cylinder 13 is provided which is arranged parallel to the wheel carriers 16 in the middle of the chassis and, through the intermediary of the piston rod 18 on the one hand and the cylinder 13 on the other hand, acts on the intermediate links 19 which are hingedly connected to levers 20 which in turn, being preferably mounted in the corners of the rectangular chassis, actuate the clamping arrangements 7 by means of cam systems not shown in the drawings. The wheel carriers 16 and the clamping device 7 are illustrated on a larger scale in Figs. 8 and 9. The advantageous constructional arrangement of the pressure cylinders 9 is also clearly recognizable. These cylinders 9 slide on the pistons 21 which, through the intermediary of their piston rods 22, are rigidly connected with the chassis 6 at both ends by means of holding blocks or brackets 23. The cylinders 9 are directly connected to the swing trough 1 by means of the blocks 25 with interposed spring elements 12 (see Fig. 7) consisting of two individual spring members interconnected by a Cardan joint 24. To prevent the cylinders 9 from twisting axially on the piston rods 22 sliding guide shoes 26 are provided which engage in corresponding recesses in the longitudinal girders of the chassis 6. To prevent the pistons 21 from striking against the cylinder covers 27 springs 28 are mounted thereon in known manner.

Figures 7, 8, 9:
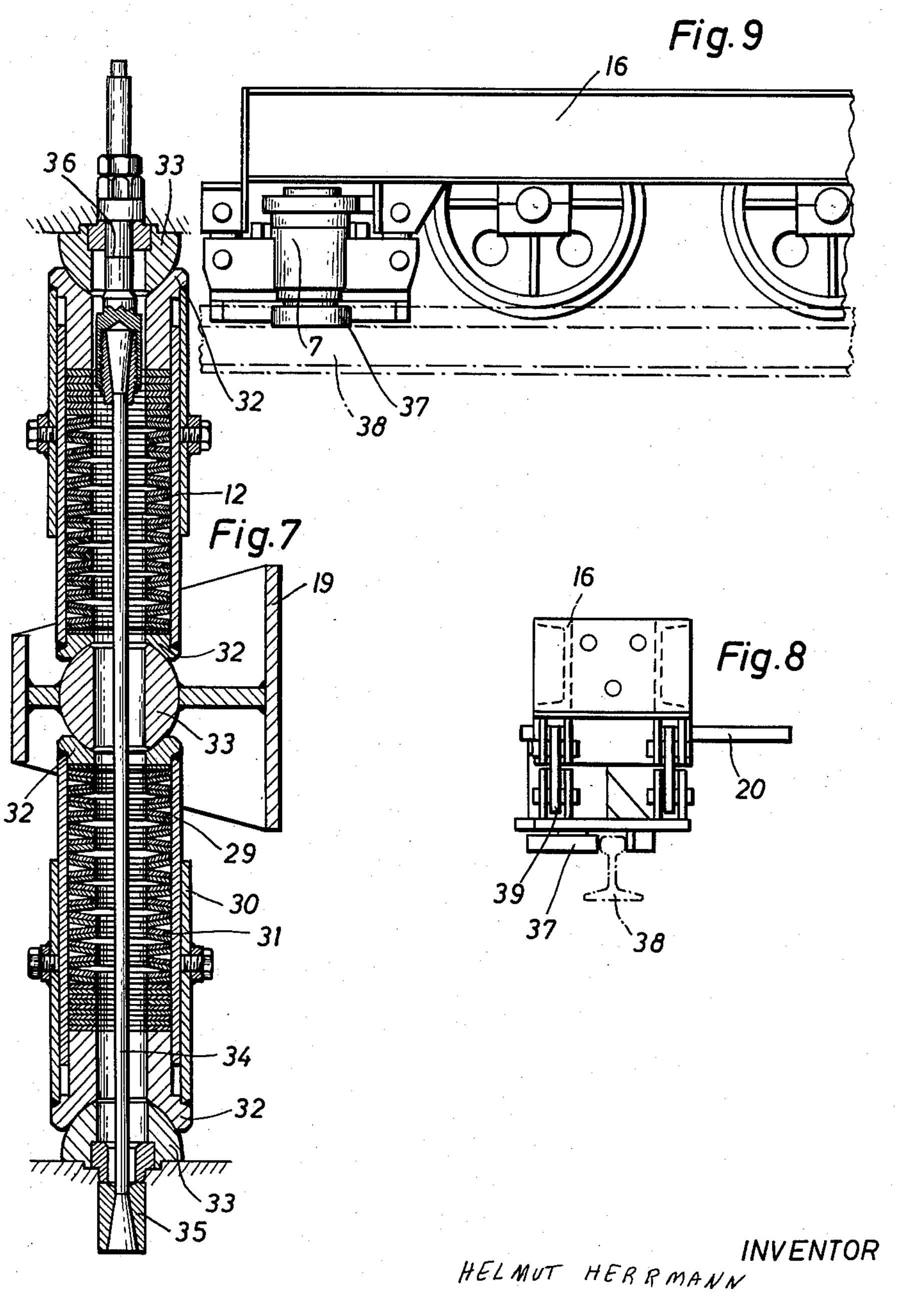
Fig. 7 is a form of construction of the resilient connection between the pressure and retracting cylinders on the one hand and the swing trough on the other hand.
Fig. 8 shows the rail clamping device in side elevation.
Fig. 9 shows the set of wheels with a portion of the vehicle frame and the rail clamping device fixed on the frame.

Fig. 7 shows a form of construction of the spring elements and how they cooperate with their corresponding points of fixation on the cylinders and the swing trough. The spring elements 12 consist of tubular bodies 29, 30 in which cup springs 31 are piled up. The tubular bodies terminate at both ends in socket pans 32 in which balls 33 engage. The bearing bracket 19 and the two spring elements 12 are constructed as a pre-assembled unit. To enable this unit to be fitted, the two spring elements must be pre-stressed, which is effected by means of a rope 34 which is fixed at one end to an anchorage 35 and stretched by a turnbuckle or tightener 36 at the other end. After the unit has been inserted the stress is released.

Fig. 8 shows the suspension of the rail clamping device 7. The vehicle is clamped to the rails 38 by clamping jaws 37. These clamping jaws are cam-controlled and suspended in the chassis girders 16 by loosely mounted links 39. This arrangement is again illustrated in side elevation in Fig. 9 for the sake of clearness.

Figure 10:
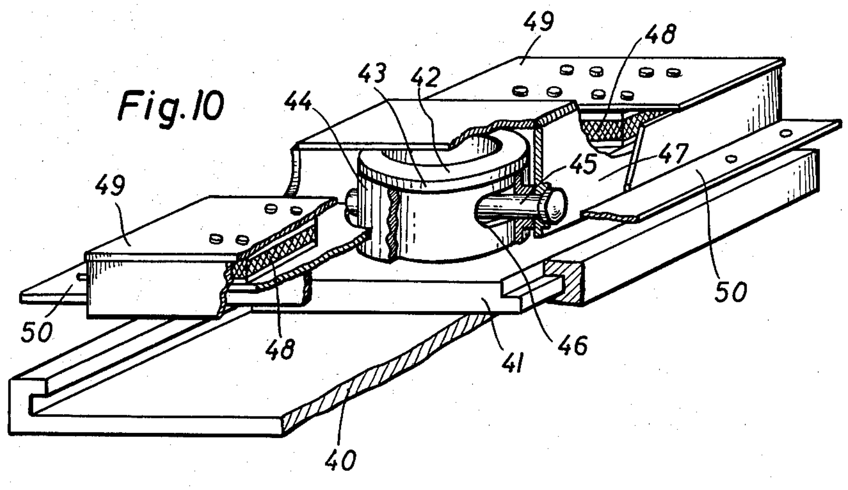
Fig. 10 is a perspective view of the Cardan suspension.

The Cardan suspension of the mass composed of the loading shovel 2 and the conveyor trough 1 freely oscillatable in relation to the chassis 6, is illustrated in perspective in Fig. 10. A guide plate 41 slides in a guide 40 mounted on the chassis frame 6. A cylindrical Cardan member 42 rests on this plate and is rigidly connected therewith. It has on its upper end a flange 43. Another cylindrical member 44 is rotatable on this Cardan member 42 between the guide plate 41 and the flange 43. An axle 45 extends transversely through the two cylindrical members and is connected to the outer member 44. Slot-shaped apertures 46 are provided in the inner member 42 so that the inner member has a certain amount of horizontal turning play in relation to the axle 45. The outer cylindrical member 44 is connected with the carrier parts 47 by means of the axle 45 so that it can swing in a vertical plane. These carrier parts are again connected by antivibration springs 48 to the constructional parts 49 which are directly connected to the trough 1 with the aid of the bolt holes 50. By this arrangement the swing trough is both displaceable in axial direction and can turn within certain limits horizontally and vertically. Moreover the trough can swing freely in relation to the chassis and to the actual Cardan suspension.

The low constructional height of the swing loader according to the invention, as well as its restricted length, enable it to travel underground even along tortuous galleries and to be combined with a number of other arrangements. These may be arrangements which transport the material from the loader through the gallery, which set up the walling during the loading operation or drilling machines which, arranged above the conveyor, allow drilling to be carried out without it being necessary to pull back the loading machine.

Figure 11:
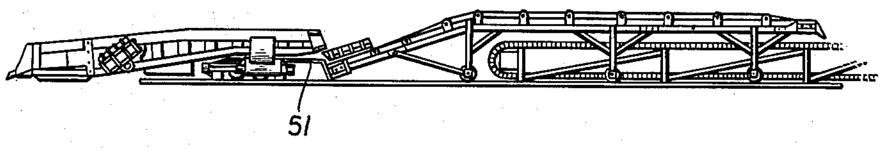
Fig. 11 shows a form of construction for the insertion of the swinging trough combined with other conveying devices.

Fig. 11 illustrates the possibility of delivering the material fed by the swing loader according to the invention, to a conveyor belt which carries the material to a gallery conveyor.

Figure 12:
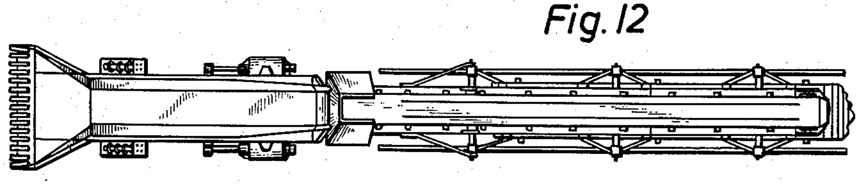
Fig. 12 is a top plan view of Fig. 11.

Fig. 12 shows this arrangement in top plan view. The intermediate conveyor can be connected to the swing loader according to the invention by an articulated lever 51 or a rope so that it can always be moved forward as the working progresses. To ensure that the distance between the swing trough and the intermediate loading device is always maintained, a rod 51 is provided in the form of construction illustrated, which rod is hinged directly to the slide shoe at the bearing point between the swing trough and the chassis and with its other end pulls along the intermediate loading device.

Figure 13:
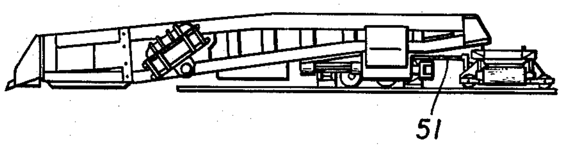
Figs. 13, 14 and 15 illustrate how the material to be loaded is transferred to the gallery conveying system by a transverse conveyor.
Figure 14:
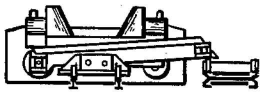
Figure 15:
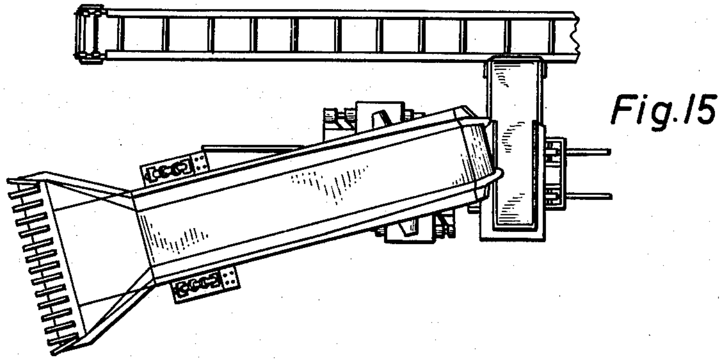
Figure 16:
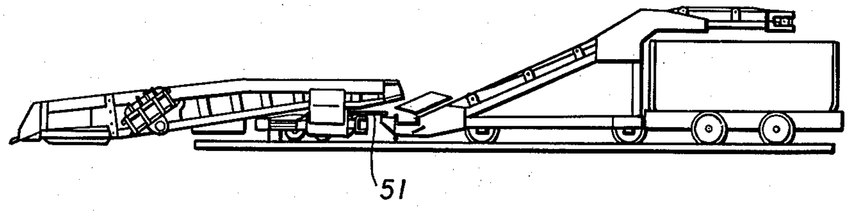
Figs. 16 and 17 are a side elevation and a plan view respectively showing the additional conveying means for transporting the material from the swing loader to the conveyor truck.
Figure 17:
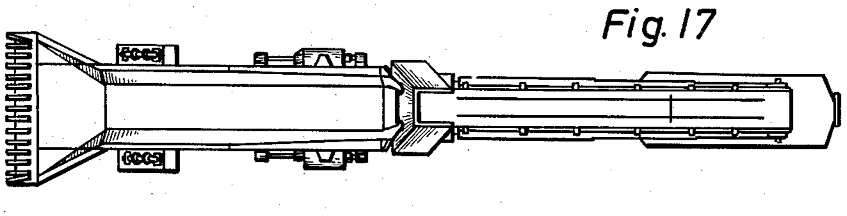

In many underground workings, the conveying means are arranged along the side of the gallery. In this case it is necessary to provide the swing loader according to the invention with a small transverse conveyor which must also be connected directly to the swing trough so that it is moved forward as the working progresses. These arrangements are illustrated in Figs. 13, 14 and 15. Figs. 16 and 17 show in side elevation and top plan view respectively a conveying system combined with a swing loader according to the invention and transporting the material into trucks. As this conveyor system has to take up the thrust energy of the on-coming trucks, the connection to the conveyor trough must be elastic.

Figure 18:
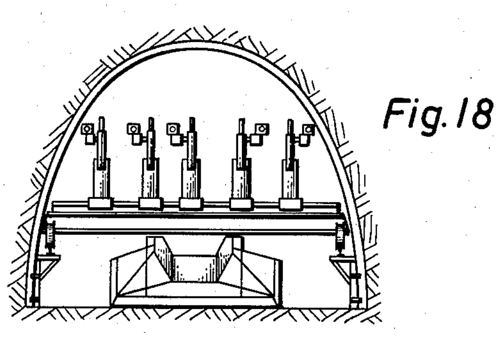
Figs. 18 and 19 show in side elevation and top plan view respectively a drilling platform arranged above the swing loader according to the invention.
Figure 19:
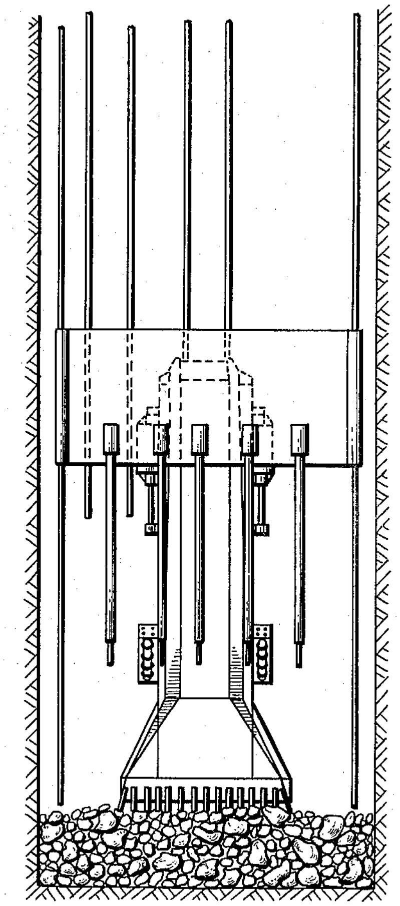

Figs. 18 and 19 show how the low height measurements of the machine according to the invention are particularly advantageous in underground workings and what possibilities are afforded, for example, by combining the collecting and transporting of the heaps of debris with drilling or walling operations. A travelling drilling machine and a platform can be brought into any desired working position above the conveyor without it being necessary to put the conveyor itself out of operation. It is well known that overlapping the working operations in underground mining is extremely advantageous.

I claim:

1. A loading machine of the swing type for collecting and conveying granular material which comprises a conveyor loading trough having a shovel means at its forward end, a base vehicle for said trough which is capable of linear travel, interconnecting means for pivotally connecting said trough to said base vehicle for vertical and horizontal pivoting about a point and for longitudinally displacing said trough with respect to said base vehicle, and oscillating means disposed on said trough for carrying out linear oscillations at an acute angle with respect to the longitudinal axis of said trough, said oscillating means being positioned on said trough at a point substantially forward of the center of gravity of said trough with respect to its forward end.

2. Loading machine according to claim 1 wherein means for laterally swinging said trough are provided including a pair of spaced apart parallel piston means connected to said base vehicle and a corresponding pair of spaced apart parallel coacting cylinder means connected to said trough by resilient connecting means.

3. Loading machine according to claim 1 wherein said oscillating means includes a pair of oscillating members, each positioned on a corresponding side of said trough with its longitudinal axis at an angle of from about 5 to 8 degrees with respect to the horizontal, the length of said base vehicle being in the ratio of about 1:3 with respect to the total length of said trough.

4. Loading machine according to claim 1 wherein said loading shovel is provided with a support rest runner therebeneath resiliently connected to said trough.

5. Loading machine according to claim 1 wherein said base vehicle is provided with two sets of tandem wheels adapted to run along corresponding rails, each tandem set being mounted for rotation within a longitudinal frame parallel to the longitudinal direction of the base vehicle, each frame being displaceably mounted on said base vehicle for varying the width between the tandem sets to correspond to the width between the rails.

6. Loading machine according to claim 5 wherein clamping means for clamping the base vehicle to the rails are provided, including a piston-cylinder arrangement disposed on said base vehicle, clamping jaws hingedly depending from the under side of said base vehicle, and linkage means operatively connecting said piston-cylinder arrangement to said clamping jaws for moving said jaws into and out of clamping engagement with a corresponding rail.

7. In a loading machine of the swing type for collecting and conveying granular material including a conveyor loading trough having a shovel means at its forward end, a base vehicle for said trough which is capable of linear travel, and inter-connecting means for pivotally connecting said trough to said base vehicle for vertical and horizontal pivoting about a point and for longitudinally displacing said trough with respect to said base vehicle, the improvement which comprises means for laterally swinging the trough including a pair of spaced apart piston means each laterally connected to a corresponding side of the base vehicle parallel to the longitudinal axis of said vehicle, each including a double acting piston positioned on a piston rod intermediate the ends thereof, and a corresponding pair of spaced apart coacting cylinder means each connected to the trough by resilient connecting means, each including a double acting cylinder mounted for movement on a corresponding piston rod with the piston received slidably therewithin, the ends of the piston rod extending through the ends of the cylinder, each said piston means and its corresponding cylinder means being operable simultaneously in the same direction of movement with as well as in the opposite direction of movement from the other said piston means and its corresponding cylinder means.

8. Improvement according to claim 7 wherein said resilient connecting means includes axially resilient means pivotally mounted on said cylinder and turnably interconnected with said trough.

9. Improvement according to claim 8 wherein said axially resilient means includes a pair of axially aligned tubular members telescopingly arranged at their remote ends within and resiliently outwardly urged from a corresponding tubular recess member, each said recess member being pivotally mounted on said cylinder, the near ends of said tubular members revolvably abutting an intermediate pivot surface connected to said trough.

10. Improvement according to claim 9 wherein a plurality of coacting pairs of cup springs under stress are provided within each said tubular member and its corresponding tubular recess member to outwardly urge said tubular member from said tubular recess member.

11. Improvement according to claim 7 wherein upon anchoring said base vehicle against linear travel, said cylinders are operable to move simultaneously in forward direction in turn linearly moving said trough in forward direction with respect to the base vehicle, and wherein upon releasing the anchoring of said base vehicle and anchoring said trough against linear movement, said cylinders are operable to move said base vehicle in forward direction while said cylinders remain stationary with said trough using the anchoring of said trough as leverage for effecting the movement of said base vehicle.

12. In a loading machine of the swing type for collecting and conveying granular material including a conveyor loading trough having a shovel means at its forward end, a base vehicle for said trough which is capable of linear travel, and inter-connecting means for pivotally connecting said trough to said base vehicle for vertical and horizontal pivoting about a point and for longitudinally displacing said trough with respect to said base vehicle, the improvement which comprises a Cardan suspension for suspending the trough on the base vehicle at one point including a tube member connected to the base vehicle, having slots defined therein through which an axle connected to the trough is passed.

13. In a loading machine of the swing type for collecting and conveying granular material including a conveyor loading trough having a shovel means at its forward end, a base vehicle for said trough which is capable of linear travel, and inter-connecting means for pivotally connecting said trough to said base vehicle for vertical and horizontal pivoting about a point and for longitudinally displacing said trough with respect to said base vehicle, the improvement which comprises a Cardan suspension for suspending the trough on the base vehicle at one point including a tube member having slots defined therein through which an axle connected to the trough is passed, the length of said slots defining a limited path of movement for said axle in a plane passing through said slots, said tube member being slidably connected to the base vehicle by means of a guide member slidably disposed within a corresponding guide groove positioned on said base vehicle.

References Cited in the file of this patent

UNITED STATES PATENTS

| | | |
|---|---|---|
| 1,306,064 | Joy | June 10, 1919 |
| 2,272,504 | Bigelow | Feb. 10, 1942 |
| 2,638,200 | Russell | May 12, 1953 |

FOREIGN PATENTS

| | | |
|---|---|---|
| 668,624 | Germany | Dec. 7, 1938 |
| 827,053 | Germany | Jan. 7, 1952 |
| 888,526 | Germany | Sept. 3, 1953 |

UNITED STATES PATENT OFFICE

CERTIFICATE OF CORRECTION

May 2, 1961 atent No. 2,982,391

Helmut Herrmann

It is hereby certified that error appears in the above numbered patent requiring correction and that the said Letters Patent should read as corrected below.

In the grant, lines 2 and 12, in the heading to the printed specification, lines 3 and 4, name of assignee, for "Gewerkschaft Eisenhutte Westphalia," each occurrence, read -- Gewerkschaft Eisenhutte Westfalia --; column 2, line 18, for "etxends" read -- extends --; line 23, for "displacement" read -- displacements --; column 3, line 49, for "ind" read -- and --.

Signed and sealed this 19th day of September 1961.

(SEAL)
Attest:

ERNEST W. SWIDER
Attesting Officer

DAVID L. LADD
Commissioner of Patents

USCOMM-DC